(12) United States Patent
Oser

(10) Patent No.: US 11,775,130 B2
(45) Date of Patent: *Oct. 3, 2023

(54) GUIDED RETAIL EXPERIENCE

(71) Applicant: Apple Inc., Cupertino, CA (US)

(72) Inventor: Alexander B. Oser, Los Altos, CA (US)

(73) Assignee: Apple Inc., Cupertino, CA (US)

(*) Notice: Subject to any disclaimer, the term of this patent is extended or adjusted under 35 U.S.C. 154(b) by 49 days.

This patent is subject to a terminal disclaimer.

(21) Appl. No.: 16/905,032

(22) Filed: Jun. 18, 2020

(65) Prior Publication Data
US 2021/0004137 A1 Jan. 7, 2021

Related U.S. Application Data

(60) Provisional application No. 62/870,442, filed on Jul. 3, 2019.

(51) Int. Cl.
| | |
|---|---|
| *G06F 3/04815* | (2022.01) |
| *G06F 3/01* | (2006.01) |
| *G06V 20/20* | (2022.01) |
| *G06Q 30/0601* | (2023.01) |

(52) U.S. Cl.
CPC .......... *G06F 3/04815* (2013.01); *G06F 3/017* (2013.01); *G06Q 30/0601* (2013.01); *G06Q 30/0613* (2013.01); *G06Q 30/0643* (2013.01); *G06V 20/20* (2022.01)

(58) Field of Classification Search
None
See application file for complete search history.

(56) References Cited

U.S. PATENT DOCUMENTS

| | | | |
|---|---|---|---|
| 9,679,332 B2 | 6/2017 | Kim et al. | |
| 9,734,634 B1 | 8/2017 | Mott et al. | |
| 9,747,622 B1 | 8/2017 | Johnson et al. | |
| 9,779,444 B2 | 10/2017 | Yalniz et al. | |

(Continued)

FOREIGN PATENT DOCUMENTS

WO 2019/067476 A2 4/2019

OTHER PUBLICATIONS

Applicant-Initiated Interview Summary received for U.S. Appl. No. 16/904,995, dated Jun. 25, 2021, 2 pages.

(Continued)

*Primary Examiner* — Adam M Queler
*Assistant Examiner* — Maria S Ayad
(74) *Attorney, Agent, or Firm* — DLA Piper LLP (US)

(57) ABSTRACT

The present disclosure relates to techniques for enabling a retail experience in a computer-generated reality environment. In some embodiments, the techniques include: generating a computer-generated reality environment, including presenting a virtual object representing a product in the computer-generated reality environment; providing a communication session with a remote user of the product while presenting the virtual object representing the product in the computer-generated reality environment; and while providing the communication session, adjusting the presentation of the virtual object representing the product in the computer-generated reality environment using information received from the communication session.

24 Claims, 11 Drawing Sheets

(56) References Cited

U.S. PATENT DOCUMENTS

| | | | |
|---|---|---|---|
| 9,910,927 B2 | 3/2018 | Cypher et al. | |
| 9,965,793 B1 | 5/2018 | Hasan et al. | |
| 10,002,337 B2* | 6/2018 | Siddique | G06Q 30/06 |
| 10,026,629 B2 | 7/2018 | Nakamori et al. | |
| 10,176,471 B2 | 1/2019 | Hodges | |
| 10,354,256 B1 | 7/2019 | Mcinerny | |
| 10,379,881 B2* | 8/2019 | Wesley | G06F 8/38 |
| 10,573,019 B1 | 2/2020 | Anadure et al. | |
| 10,737,185 B2* | 8/2020 | Fargo | A63F 13/54 |
| 10,755,485 B2 | 8/2020 | Mott et al. | |
| 10,789,622 B2 | 9/2020 | Ayush et al. | |
| 10,817,066 B2* | 10/2020 | Ross | H04L 67/131 |
| 2005/0267778 A1 | 12/2005 | Kazman | |
| 2007/0143082 A1 | 6/2007 | Degnan | |
| 2008/0071559 A1 | 3/2008 | Arrasvuori | |
| 2008/0263458 A1* | 10/2008 | Altberg | G06Q 30/0241 |
| | | | 715/757 |
| 2009/0285483 A1 | 11/2009 | Guven et al. | |
| 2009/0287534 A1 | 11/2009 | Guo et al. | |
| 2010/0030578 A1* | 2/2010 | Siddique | H04W 4/00 |
| | | | 705/26.1 |
| 2012/0086727 A1 | 4/2012 | Korah et al. | |
| 2012/0206449 A1 | 8/2012 | Stark | |
| 2013/0215116 A1* | 8/2013 | Siddique | G06Q 20/40 |
| | | | 705/26.7 |
| 2013/0249937 A1 | 9/2013 | Amacker et al. | |
| 2014/0172570 A1 | 6/2014 | Y Arcas et al. | |
| 2014/0208272 A1* | 7/2014 | Vats | G06F 3/011 |
| | | | 715/852 |
| 2014/0236776 A1* | 8/2014 | Fries | G06Q 30/0643 |
| | | | 705/27.2 |
| 2014/0333664 A1* | 11/2014 | Williams | G06Q 30/0643 |
| | | | 345/633 |
| 2016/0189288 A1* | 6/2016 | Todeschini | G06Q 30/0643 |
| | | | 705/27.2 |
| 2016/0210602 A1 | 7/2016 | Siddique et al. | |
| 2017/0031503 A1* | 2/2017 | Rosenberg | G06F 3/04842 |
| 2017/0053443 A1* | 2/2017 | Diament | G06F 1/1643 |
| 2017/0131964 A1* | 5/2017 | Baek | G06F 3/1423 |
| 2017/0132841 A1 | 5/2017 | Morrison | |
| 2017/0323488 A1* | 11/2017 | Mott | G06Q 30/0643 |
| 2018/0059902 A1* | 3/2018 | Martin | G06F 3/04815 |
| 2018/0061128 A1* | 3/2018 | Cabanier | G02B 27/017 |
| 2018/0107269 A1* | 4/2018 | Benzies | G06F 3/011 |
| 2018/0114372 A1* | 4/2018 | Nagy | G06T 19/006 |
| 2018/0124351 A1* | 5/2018 | Mattingly | G06F 3/14 |
| 2018/0157333 A1* | 6/2018 | Ross | G06F 3/013 |
| 2018/0173323 A1* | 6/2018 | Harvey | G06F 3/014 |
| 2018/0275749 A1 | 9/2018 | Yoon et al. | |
| 2018/0308377 A1* | 10/2018 | Pena-Rios | G09B 5/12 |
| 2018/0324229 A1* | 11/2018 | Ross | G06F 3/1423 |
| 2019/0065026 A1* | 2/2019 | Kiemele | A63F 13/92 |
| 2019/0068580 A1 | 2/2019 | Amid | |
| 2019/0107990 A1* | 4/2019 | Spivack | G06T 11/60 |
| 2019/0114689 A1 | 4/2019 | Wang et al. | |
| 2019/0146219 A1* | 5/2019 | Rodriguez, II | G06F 3/017 |
| | | | 345/633 |
| 2019/0156404 A1 | 5/2019 | Gabriele et al. | |
| 2019/0172261 A1 | 6/2019 | Alt et al. | |
| 2019/0279283 A1 | 9/2019 | Benkar et al. | |
| 2019/0370544 A1 | 12/2019 | Wright et al. | |
| 2020/0117336 A1 | 4/2020 | Mani et al. | |
| 2020/0184217 A1* | 6/2020 | Faulkner | G06F 16/5866 |
| 2020/0202634 A1 | 6/2020 | Faulkner et al. | |
| 2020/0349614 A1 | 11/2020 | Batcha et al. | |
| 2021/0005022 A1 | 1/2021 | Oser et al. | |
| 2021/0110646 A1* | 4/2021 | Dixit | G02B 27/017 |

OTHER PUBLICATIONS

Final Office Action received for U.S. Appl. No. 16/904,995, dated Sep. 20, 2021, 21 pages.
Extended European Search Report received for European Patent Application No. 20183570.9, dated Sep. 1, 2020, 7 pages.
Extended European Search Report received for European Patent Application No. 20183573.3, dated Sep. 4, 2020, 7 pages.
Non-Final Office Action received for U.S. Appl. No. 16/904,995, dated Mar. 23, 2021, 15 pages.
Applicant-Initiated Interview Summary received for U.S. Appl. No. 16/904,995, dated Feb. 22, 2022, 2 pages.
Office Action received for European Patent Application No. 20183570.9, dated Feb. 3, 2022, 7 pages.
Notice of Allowance received for U.S. Appl. No. 16/904,995, dated May 18, 2022, 8 pages.
Office Action received for European Patent Application No. 20183573.3, dated Oct. 14, 2022, 7 pages.

* cited by examiner

GUIDED RETAIL EXPERIENCE

CROSS-REFERENCE TO RELATED APPLICATIONS

This application claims the benefit of U.S. Provisional Patent Application 62/870,442, entitled "Simulated Reality Enabled Retail Experience," filed Jul. 3, 2019, the content of which is incorporated herein by reference in its entirety.

TECHNICAL FIELD

The present disclosure relates generally to computer-generated reality (CGR) environments, and more specifically to representations of electronic products in CGR environments.

BACKGROUND

Conventional electronic consumer experiences allow a user to browse and purchase products online with an electronic device, such as a laptop or desktop computer, tablet computer, or smartphone. A user can access product information through a website or application, select a product, and purchase the product without interaction with another human.

SUMMARY

Described herein are techniques for enabling a retail experience in a CGR environment. Online shopping can lack the instantaneous feedback, answers to questions, suggestions, demonstrations of products, and human connection of an in-person shopping experience. Current online consumer applications require a user to browse through menus or perform a search function to locate a product of interest. Additionally, the user is unable to fully interact with the online representation of the product and, therefore, cannot truly experience a full demonstration of the product while in a remote environment. The techniques described herein provide real-time communications with a remote salesperson (via a virtual communication session) who can guide a user through a shopping experience in a CGR environment. This allows a user to remain in a remote environment while having an interactive shopping experience with the salesperson, who can provide relevant products, make suggestions based on the interaction, and facilitate full demonstrations of various products and services in the CGR environment. The salesperson can cause a product, or a collection of products, to be displayed in the CGR environment, and the user can interact with the products to perform a demonstration of the product with or without input from the salesperson. The salesperson can also manipulate the products to point out features and demonstrate capabilities of the product without input from the user. The techniques disclosed herein provide the user with a retail experience that is in a remote environment such as the user's house, but with the benefits and capabilities of an in-person shopping experience.

In some embodiments, techniques for enabling a retail experience in a CGR environment include, at a first electronic device: generating a CGR environment, including presenting a virtual object representing a product in the CGR environment; providing a communication session with a remote user while presenting the virtual object representing the product in the CGR environment; and while providing the communication session, adjusting the presentation of the virtual object representing the product in the CGR environment using information received from the communication session.

In some embodiments, the communication session is provided in response to receiving a request to initiate the communication session.

In some embodiments, presenting the virtual object representing the product includes superimposing the virtual object on a physical display of a physical device in the CGR environment.

In some embodiments, the techniques further include: while providing the communication session, detecting an input; and in response to detecting the input, modifying the virtual object representing the product in the CGR environment based on the detected input.

In some embodiments, the input corresponds to a gesture.

In some embodiments, modifying the virtual object representing the product in the CGR environment based on the detected input includes modifying an appearance of one or more virtual objects based on at least one of a magnitude and direction of the gesture.

In some embodiments, adjusting the presentation of the virtual object representing the product in the CGR environment using information received from the communication session includes presenting a different virtual object.

In some embodiments, adjusting the presentation of the virtual object representing the product in the CGR environment using information received from the communication session includes ceasing to present a virtual object.

In some embodiments, the product is a physical product configured to perform a set of operations in response to detecting a first set of inputs directed to the physical product; and the virtual object representing the product is a virtual representation of the physical product configured to perform the set of operations in response to detecting the first set of inputs directed to the virtual representation of the physical product.

In some embodiments, generating the CGR environment includes presenting a virtual representation of the salesperson in the CGR environment.

In some embodiments, the CGR environment is an augmented reality environment. In some embodiments, the techniques further include: detecting a second input; and in response to detecting the second input, transitioning the CGR environment to a virtual reality environment while continuing to provide the communication session.

In some embodiments, the CGR environment is generated in response to detecting an input directed to an object associated with an application presented using the electronic device.

In some embodiments, the techniques further include generating a data stream to be received by a second electronic device associated with the remote user, and the data stream includes a representation of at least a portion of the CGR environment.

In some embodiments, systems, electronic devices, or computer-readable storage media (transitory or non-transitory) provide the described techniques.

BRIEF DESCRIPTION OF THE DRAWINGS

In the following description, reference is made to the accompanying drawings which form a part thereof, and which illustrate several embodiments. It is understood that other embodiments may be utilized and structural and operational changes may be made without departing from the scope of the present disclosure. The use of the same reference symbols in different drawings indicates similar or identical items.

DETAILED DESCRIPTION

Figure 1A:
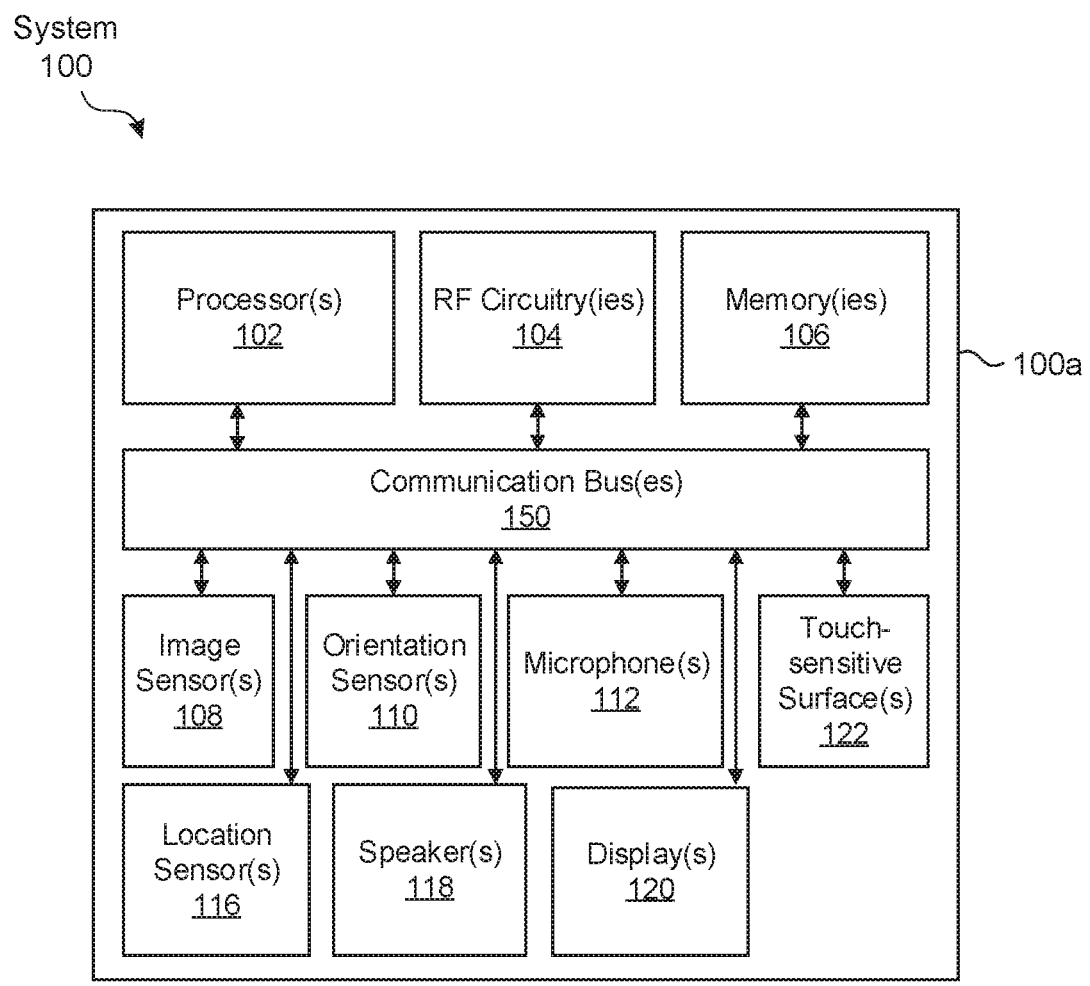
FIGS. 1A-1B depict exemplary systems for use in various computer-generated reality technologies.

Various examples of electronic systems and techniques for using such systems in relation to various computer-generated reality technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, an MR environment is anywhere between, but not including, a wholly physical environment at one end and a VR environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of MR include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An AR environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
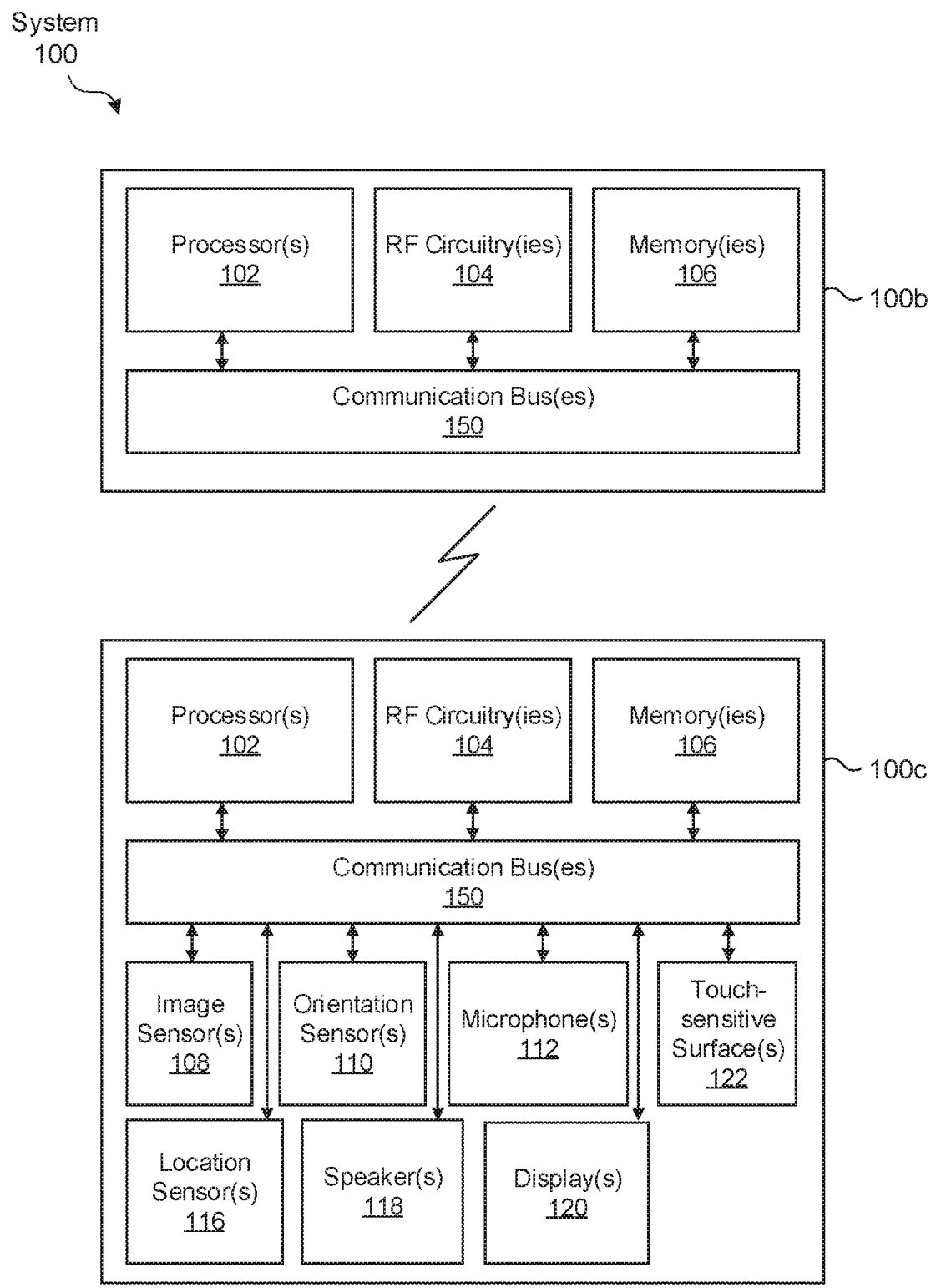

FIG. 1A and FIG. 1B depict exemplary system 100 for use in various computer-generated reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is a head-mounted display (HMD) device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

With reference now to FIGS. 2A-2H, exemplary techniques for enabling a retail experience in a CGR environment are described.

Figure 2A:
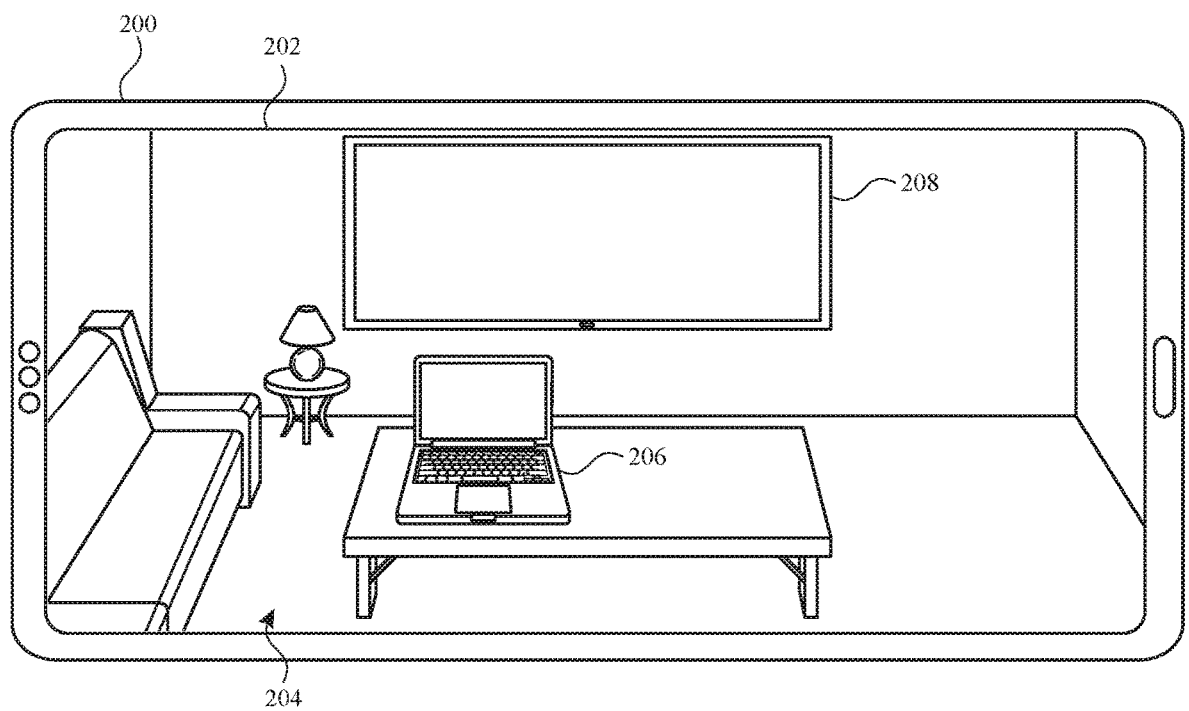
FIGS. 2A-2H illustrate a device displaying a retail experience that is enabled in a CGR environment.

FIG. 2A illustrates device 200 with display 202. Device 200 is similar to device 100a, and display 202 is similar to display 120. In the embodiment shown in FIG. 2A, device 200 represents a head-mounted device although, in some embodiments, device 200 can be a smartphone, tablet, desktop computer, laptop computer, or other electronic system or device with a display (e.g., device 100a in FIGS. 1A-1B). In some embodiments, device 200 is in communication with a mouse, keyboard, camera, controller(s), or other peripheral device that receives inputs.

In FIG. 2A, display 202 shows a representation of CGR environment 204 that includes physical objects such as laptop 206 and television 208. In some embodiments, display 202 is transparent and the physical objects are viewed through display 202. In some embodiments, display 202 is opaque and the physical objects are rendered on display 202. For example, the physical environment is displayed on display 202 as a representation of the physical environment, including the physical laptop and television.

Figure 2B:
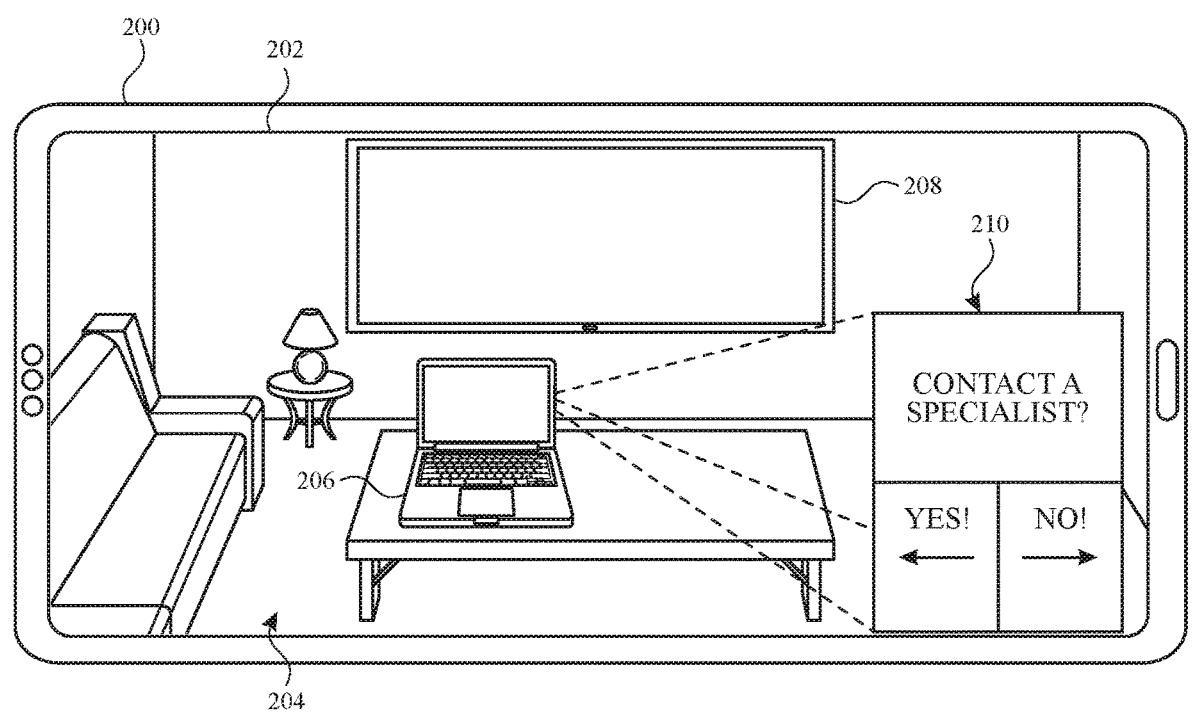

In FIG. 2B, display 202 displays prompt 210 in CGR environment 204. Prompt 210 is a virtual object that provides the user with the option to initiate a retail experience in CGR environment 204. For example, the user can gesture by waving their hand one direction or another to accept or decline the option to contact the retailer. In some embodiments, the display of prompt 210 is initiated by the user. For example, the user can view a website using laptop 206, and select a link from the website to initiate a retail experience, which initiates display of prompt 210. In some embodiments, prompt 210 is displayed automatically by device 200. For example, device 200 detects laptop 206 in CGR environment 204, determines a retailer that sells laptop 206, and initiates prompt 210 to contact the retailer that sells laptop 206. In some embodiments, prompt 210 is displayed by a virtual assistant or other artificial intelligence in communication with device 200. For example, the user can tell the virtual assistant that the user is interested in shopping for a computer similar to laptop 206. In response to the voice input from the user, the virtual assistant can initiate contact with the retailer, including, for example, displaying prompt 210 as a way to confirm the user's instructions to contact the retailer.

In response to detecting user input to contact the retailer (e.g., a gesture to confirm an instruction to contact the retailer), device 200 initiates a communication session with the retailer to enable a retail experience between the user and retailer in CGR environment 204. In some embodiments, the communication session is implemented such that a representation of a contact associated with the retailer (e.g., a salesperson) is displayed in CGR environment 204, and the user is able to interact with the retailer by speaking to the salesperson and manipulating virtual objects in CGR environment 204. Examples of such an embodiment are shown in FIGS. 2C-2H, where device 200 displays avatar 215 in CGR environment 204. In the illustrated embodiments, avatar 215 is a virtual representation of a salesperson associated with the retailer contacted using device 200.

In some embodiments, the communication session includes a two-way audio feed such that the user and salesperson can speak to each other. For example, device 200 can include a microphone (e.g., microphone(s) 112) for receiving audio input from the user and one or more speakers (e.g., speaker(s) 118) for communicating audio from the salesperson. In some embodiments, the communication session includes a limited two-way shared video feed in which the user is able to view the entirety of CGR environment 204, but the salesperson is only able to view a limited portion of CGR environment 204. For example, in such embodiments, device 200 transmits to the retailer a data stream that includes the virtual objects but excludes a visual representation of physical objects in CGR environment 204 (in some embodiments, the data stream also includes the audio feed). Thus, the salesperson receiving the data stream is unable to view physical objects of CGR environment 204 and can only view and interact with virtual objects that are displayed in CGR environment 204. Limiting the shared video feed in this manner permits device 200 to facilitate an effective retail experience while also preserving the user's privacy. The retail experience is effective because both the user and salesperson are able to view and interact with products that are displayed in CGR environment 204 as virtual objects. The user's privacy is preserved because the salesperson is unable to view the physical environment, which can be a private environment such as, for example, the user's home.

The salesperson is capable of communicating with the user and manipulating virtual objects displayed in CGR environment 204. Thus, inputs provided by the salesperson can effect a change in CGR environment 204 that is experienced by both the user and the salesperson. For example, the salesperson can manipulate the position of a virtual object, and the user can see, via device 200, the manipulation of the virtual object in CGR environment 204. Conversely, inputs provided by the user can effect a change in the content experienced by both the user and the salesperson (e.g., when the user manipulates virtual objects, the salesperson can see the virtual objects being manipulated). In some embodiments, avatar 215 represents a computer-generated position of the salesperson in CGR environment 204, and the changes made to virtual objects by the salesperson are shown in CGR environment 204 as being performed by avatar 215. In some embodiments, the salesperson participates in the communication session using a device similar to device 200. Although, in some embodiments, the salesperson is capable of participating in the communication session using other devices that are capable of implementing the above aspects of the communication session.

FIGS. 2C-2G illustrate various example embodiments of device 200 displaying the retail experience enabled in CGR environment 204.

Figure 2C:
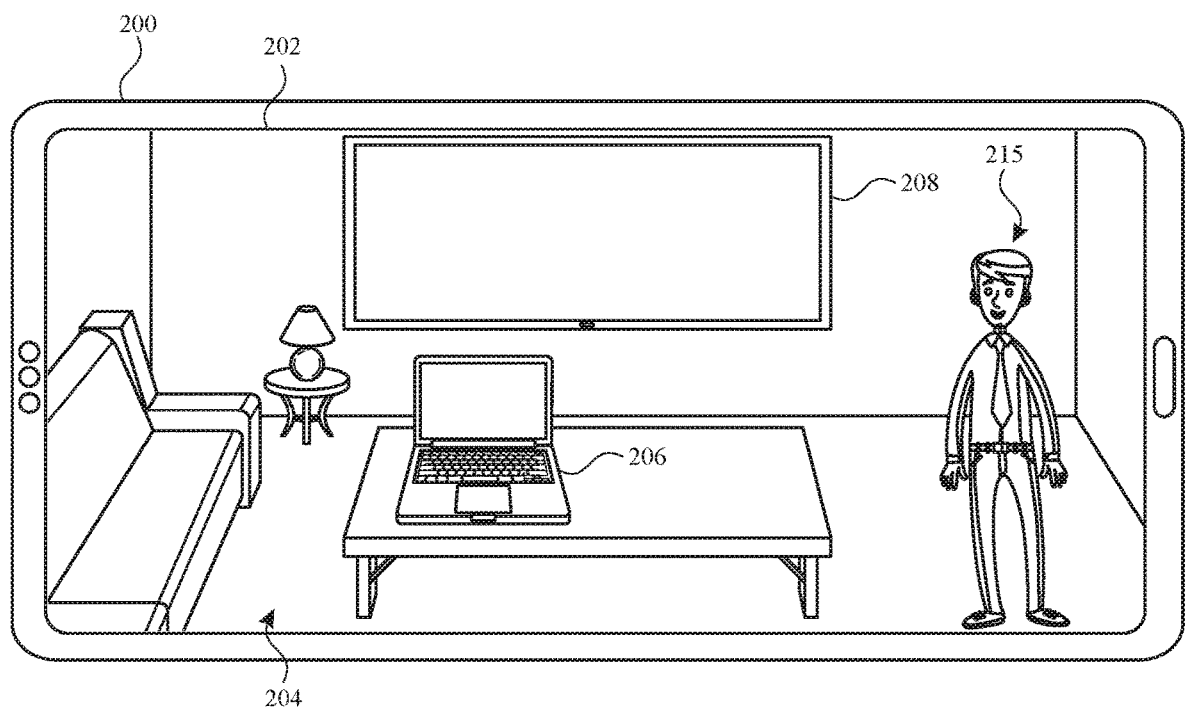

In FIG. 2C, device 200 displays avatar 215 in CGR environment 204 with laptop 206 and television 208. In this embodiment, the data stream communicated using device 200 does not include a visual representation of laptop 206 or television 208 (or other physical objects in the physical environment). Accordingly, the salesperson is unable to view these, and any other, physical objects of CGR environment 204, whereas the user is able to view the contents of display 202, including avatar 215, laptop 206, television 208, and other physical objects in physical environment.

In some embodiments, device 200 is capable of communicating details of the physical objects to the salesperson without communicating the visual representations of the physical objects. For example, device 200 can communicate information such as a make and model of laptop 206. In some embodiments, device 200 is capable of recognizing laptop 206 and retrieving (e.g., from a database or by accessing information from an information network) the details of the laptop for communicating to the salesperson. In some embodiments, the user provides details for laptop 206 while communicating with the salesperson.

Figure 2D:
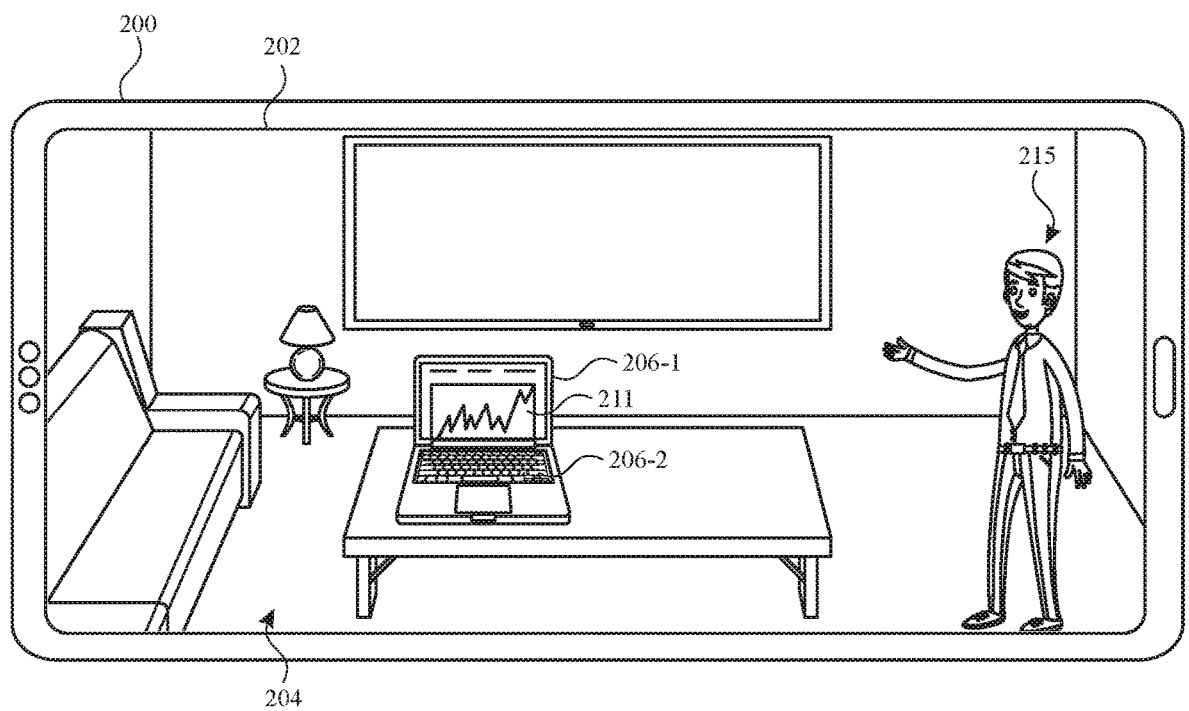

In FIG. 2D, device 200 displays first software 211 on display screen 206-1 of laptop 206. In some embodiments, display of first software 211 is initiated by the user. In some embodiments, the display of first software 211 is initiated by the salesperson to, for example, provide a demonstration of software that is capable of operating using laptop 206. For example, the salesperson can control aspects of the retail experience to initiate display of different products that are displayed in CGR environment 204 as virtual objects. Although laptop 206 is not operating first software 211 in the physical environment, device 200 displays first software 211 as a virtual object appearing on display screen 206-1 to provide, in CGR environment 204, the appearance of first software 211 operating on laptop 206. In some embodiments, first software 211 represents fully interactive software that is responsive to inputs provided using laptop 206. For example, the user can interact with laptop 206 (e.g., by typing on keyboard 206-2) in CGR environment 204. Device 200 detects the user's input on keyboard 206-2 (e.g., by identifying keyboard keys the user is contacting), and uses the detected inputs to interact with first software 211. In this way, the user can interact with physical laptop 206 in CGR environment 204 to conduct a full demonstration of the capabilities of first software 211 operating on laptop 206.

Figure 2E:
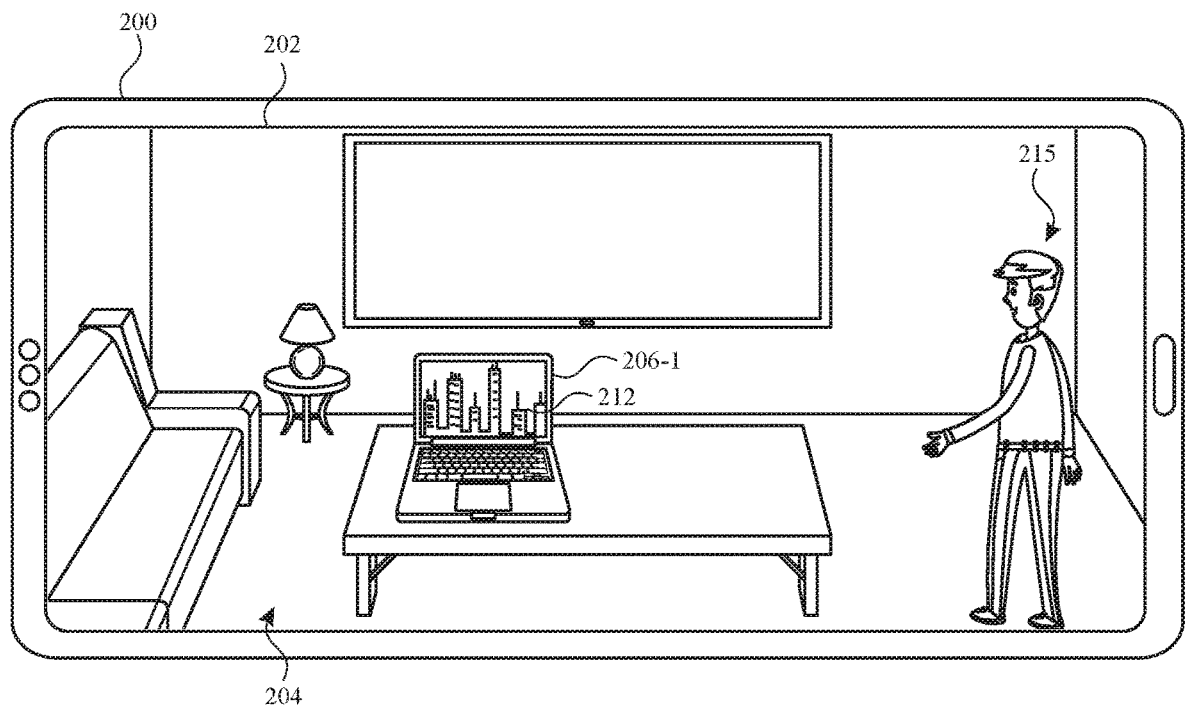

In FIG. 2E, device 200 displays second software 212 as a virtual object appearing on display screen 206-1 in CGR environment 204. Device 200 is capable of providing a full demonstration of second software 212 in a manner similar to that described above with respect to first software 211. In some embodiments, device 200 replaces first software 211 with second software 212 in response to receiving input from the salesperson (e.g., in a manner similar to that discussed above). In some embodiments, device 200 replaces first software 211 with second software 212 in response to detecting input from the user. For example, in some embodiments, device 200 can detect gestures from the user (with or without audio or other input provided from the user) that correspond to commands to display different virtual objects in CGR environment 204. In some embodiments, the gestures have a direction and/or magnitude component that can be detected by device 200 to affect the input provided from the user. Using software applications (e.g., first software 211, second software 212) as one example, device 200 can cycle between different software applications displayed in CGR environment 204 in response to detecting a swipe gesture of the user's hand. If device 200 detects the user gesturing with a short swipe in a first direction, device 200 transitions from a first software application in a virtual arrangement of software applications to a next software application in the arrangement (e.g., transitioning from application A to application B). If device 200 detects the user gesturing in the first direction with a large swipe, device 200 transitions to a different software application that has a greater displacement in the virtual arrangement of software applications (e.g., transitioning from application A to application E). When device 200 detects the gestures in the opposite direction, device 200 transitions the applications in a similar manner, but in the opposite direction (e.g., transitioning from application B to application A, or transitioning from application E to application A, depending on the detected magnitude of the gesture).

Figure 2F:
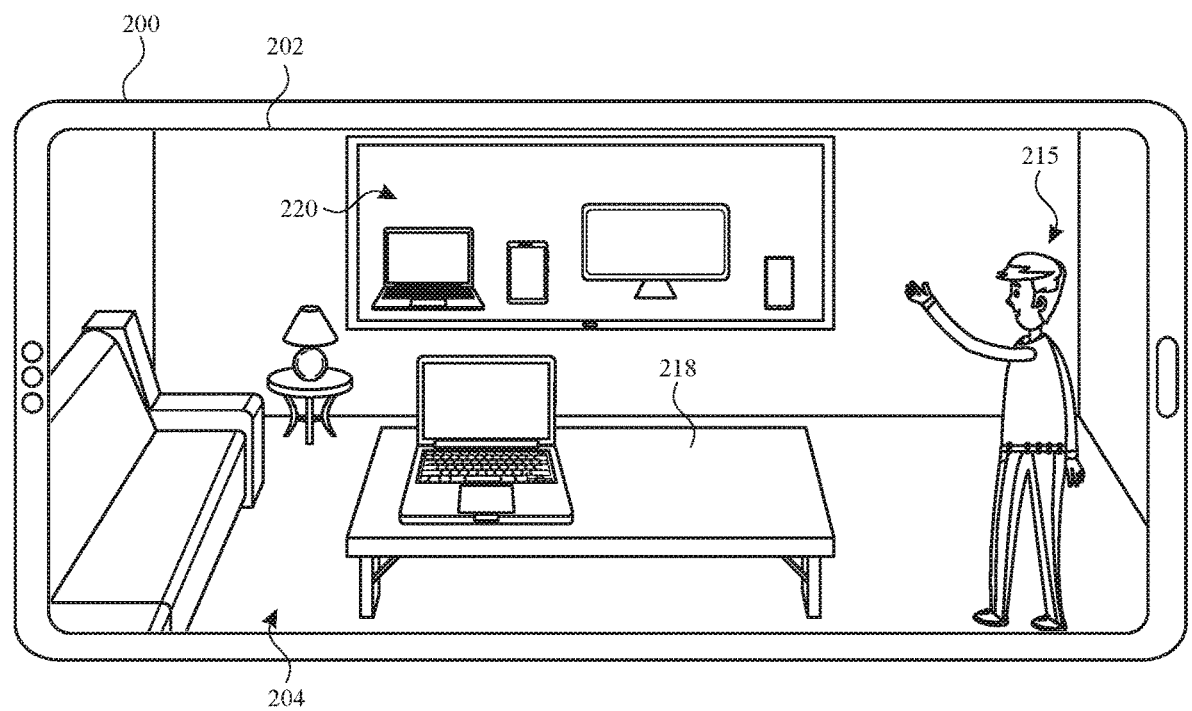
Figure 2G:
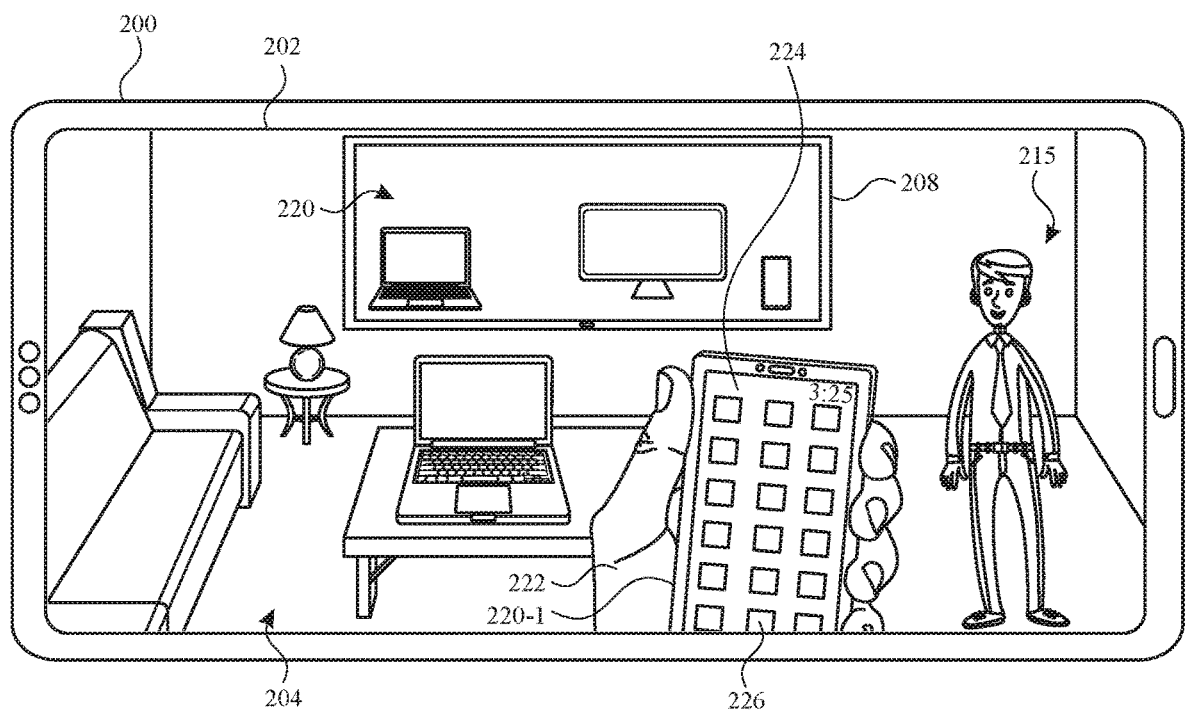

FIGS. 2F and 2G illustrate an embodiment in which the salesperson introduces display of products 220, and the user interacts with the products in CGR environment 204 as part of a demonstration of products during the retail experience. In some embodiments, the user can introduce display of products 220 in CGR environment 204.

In FIG. 2F, device 200 displays avatar 215 gesturing to products 220, which are displayed as virtual objects appearing on television 208. In some embodiments, television 208 is modified in appearance such that it appears as a product display case containing products 220. It should be appreciated that products 220 can be displayed in other locations of CGR environment 204. For example, the products can be displayed on other physical objects such as table 218 (e.g., adjacent laptop 206).

Products 220 are virtual objects that are displayed in CGR environment 204. The user can interact with products 220 to experience a demonstration of the products in CGR environment 204. For example, in the embodiment illustrated in FIG. 2G, the user retrieved smartphone 220-1 from products 220 displayed on television 208, and device 200 shows user's hand 222 holding the retrieved smartphone 220-1. Smartphone 220-1 is a virtual smartphone that is a fully functioning, virtual representation of a physical smartphone. Smartphone 220-1 is shown in CGR environment 204 having virtual display 224 displaying virtual application icons 226. In CGR environment 204, device 200 displays smartphone 220-1 behaving as if the virtual object were the real, physical object upon which the virtual object is modeled. Thus, when device 200 detects an input on smartphone 220-1, device 200 displays smartphone 220-1 responding in a same manner as the physical smartphone would respond to the same input in a physical environment. In this way, device 200 enables the user to experience a full and accurate demonstration of a smartphone through interaction with smartphone 220-1 in CGR environment 204. It should be appreciated that the user can interact with other products represented in CGR environment 204 in a similar manner. For example, device 200 can enable the user to interact with a virtual representation of a laptop, a monitor, a tablet, or any other device that can be represented in CGR environment 204.

In some embodiments, device 200 enables the user to modify virtual objects in other ways. For example, device 200 can display annotations, highlighting, or other visual modifications in CGR environment 204, so that the user can further interact with the salesperson. This can enhance the retail experience by allowing a user to indicate specific features or areas of interest in CGR environment 204.

Figure 2H:
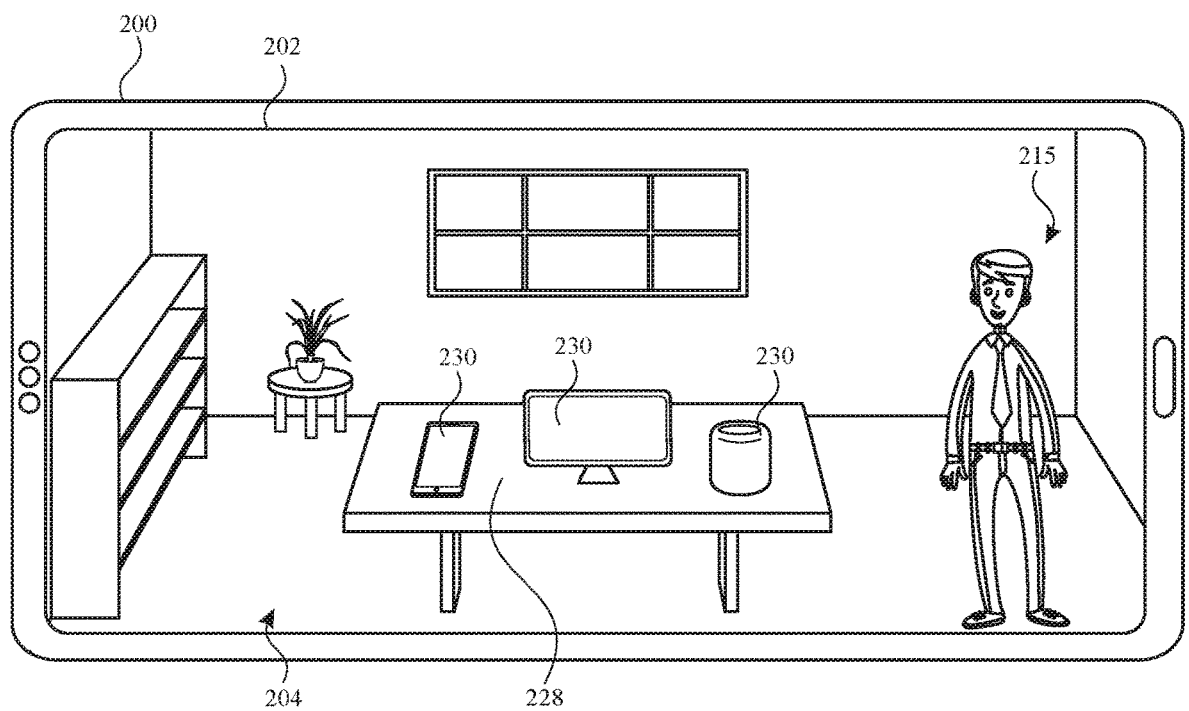

In some embodiments, device 200 can alter the CGR experience displayed to the user. For example, in some embodiments, such as that shown in FIG. 2G, CGR environment 204 is an AR environment that includes both physical objects (e.g., laptop 206, television 208, table 218) and virtual objects (e.g., products 220, smartphone 220-1, avatar 215). In response to an input (e.g., provided by the salesperson or the user), device 200 can transition the CGR environment 204 from the AR environment shown in FIG. 2G to a VR environment, as shown in FIG. 2H. In FIG. 2H, CGR environment 204 is now a VR environment that includes a virtual environment having avatar 215, virtual table 228, and virtual products 230. In the VR environment of CGR environment 204, device 200 no longer displays physical objects such as laptop 206, television 208, and table 218. In the embodiment illustrated in FIG. 2H, the VR environment is a virtual retail store displaying virtual products 230. It should be appreciated, however, that other virtual environments can be displayed in the VR environment, including representations of real locations (e.g., the Great Wall of China), or fictitious virtual locations (e.g., a computer-generated concert).

In some embodiments, device 200 allows a user to initiate a retail experience without involving a salesperson (e.g., avatar 215). For example, device 200 can display one or more virtual objects such as the virtual objects illustrated in FIG. 2F (e.g., products 220) in response to a user's request to display the devices. For example, the user can interact with a website or application to initiate the retail experience and select one or more products for viewing in CGR environment 204. The products can be displayed as virtual objects in CGR environment 204, and the user can interact with the virtual products in a manner similar to that discussed above.

In some embodiments, the salesperson (e.g., avatar 215) is a virtual salesperson such as a virtual assistant or a form of artificial intelligence for interacting with the user in CGR environment 204. In such embodiments, device 200 can be in communication with the virtual salesperson (or a network that provides the virtual salesperson) to provide information about the user and/or other devices in communication with device 200. For example, in such embodiments, device 200 can access data that informs device 200 that the user has an interest in a particular subject such as, for example, music. This information can be used by device 200 to influence the user's retail experience in CGR environment 204. For example, device 200 can display or suggest products that have a musical application in which the user may have an interest. As another example, CGR environment 204 can be displayed as a VR environment in which the user is able to experience using the virtual products (e.g., speakers, audio/visual software, etc.) to simulate performing as a disc jockey in front of a large crowd of virtual users (e.g., computer-generated people in the VR environment or, in some embodiments, real people who are experiencing the VR environment with the user).

It should be appreciated that the above techniques can be implemented in order to provide other experiences in CGR environment 204. For example, instead of enabling a retail experience to shop for a product, device 200 can enable an experience in CGR environment 204 to allow a user to troubleshoot a device in CGR environment 204. For example, the user can implement device 200 to initiate contact with a retailer to troubleshoot laptop 206. As another example, device 200 can enable a classroom environment in which the user interacts with another user (e.g., a teacher) to view and experience products in CGR environment 204 in order to learn how to use and troubleshoot products that are displayed as virtual objects in CGR environment 204.

Figure 3:
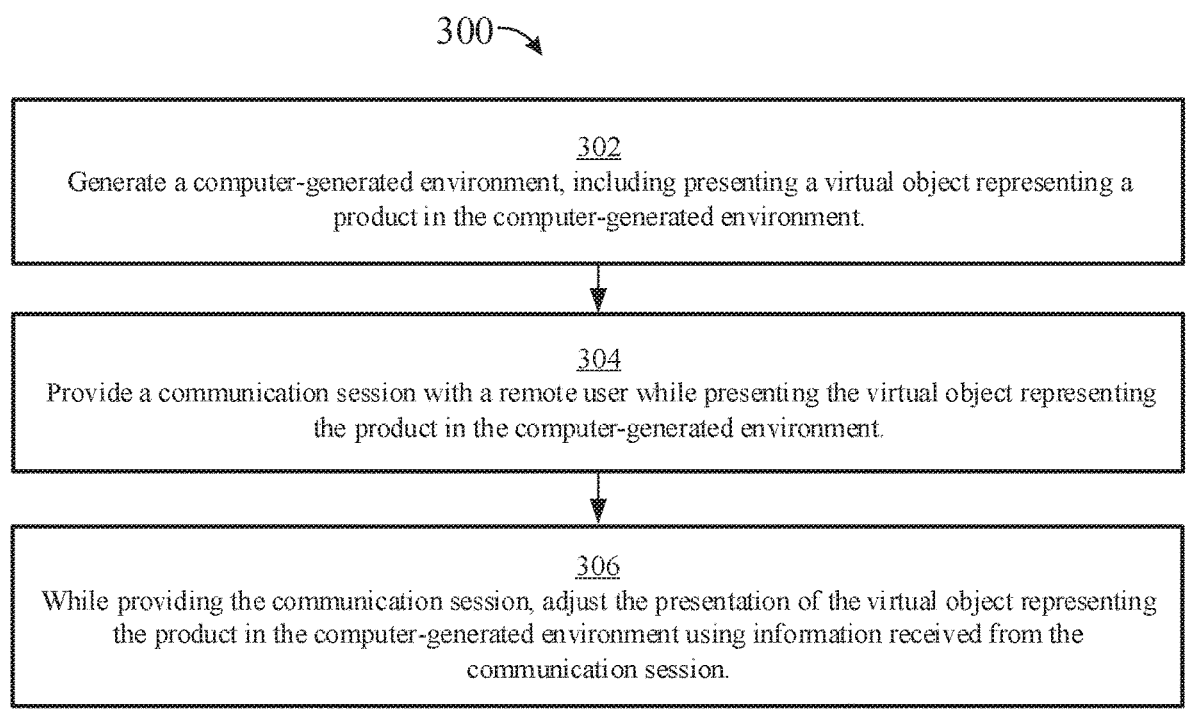
FIG. 3 depicts a flow chart of an exemplary technique for enabling a retail experience in a CGR environment.

Turning now to FIG. 3, a flow chart is depicted of exemplary technique 300 for enabling a retail experience in a CGR environment. Technique 300 can be performed using a user device (e.g., 100a or 200). Although the blocks of technique 300 are depicted in a particular order in FIG. 3, these blocks can be performed in other orders. Further, one or more blocks of technique 300 can be optional and/or additional blocks can be performed.

At block 302, the device (e.g., 100a, 200) generates a computer-generated reality environment (e.g., CGR environment 204) (e.g., a mixed reality environment; e.g., an augmented reality environment), including presenting a virtual object (e.g., first software 211; smartphone 220-1) representing a product (e.g., a software product; a smartphone product) (e.g., a representation of a product in a product gallery sold by a retail provider; e.g., a physical object; e.g., a virtual object) in the CGR environment. In some embodiments, presenting the virtual object involves displaying the virtual object on a screen such as display 120 in FIGS. 1A and 1B or display 202 in FIGS. 2A-2H.

In some embodiments, the product is a physical product (e.g., a smartphone or tablet) configured to perform a set of operations in response to detecting a first set of inputs directed to the physical product (e.g., the physical smartphone/tablet is configured to turn on and display, on a physical screen, a homepage with applications in response to detecting an input on a physical power button located on the physical smartphone/tablet). In some embodiments, the virtual object (e.g., smartphone 220-1) representing the product is a virtual representation of the physical product (e.g., a virtual smartphone or virtual tablet) configured to perform the set of operations in response to detecting the first set of inputs directed to the virtual representation of the physical product (e.g., the virtual smartphone/tablet is configured to turn on and display, on a virtual screen (e.g., 224), a homepage with applications (e.g., 226) in response to an input on a virtual power button presented as appearing on the virtual smartphone/tablet).

In some embodiments, generating the computer-generated reality environment (e.g., CGR environment 204) includes presenting a virtual representation (e.g., salesperson 215) (e.g., a virtual avatar) of a remote user (e.g., a salesperson) in the computer-generated reality environment. In some embodiments, the virtual representation of the remote user is presented in the computer-generated reality environment as a separate entity (e.g., another user) present in the computer-generated reality environment, and the virtual representation of the remote user is capable of guiding the user through a shopping experience in the computer-generated reality environment.

In some embodiments, the computer-generated reality environment (e.g., CGR environment 204) is generated in response to detecting an input directed to an object (e.g., a link, an affordance, etc.) associated with an application (e.g., a shopping application, a news application, a web browser application, etc.) presented using the electronic device.

At block 304, the device (e.g., 100a, 200) provides a communication session (e.g., a virtual communication session) with a remote user (e.g., a salesperson of the product) (e.g., a second user; e.g., a representative of the retail provider; e.g., an automated or virtual assistant) while presenting the virtual object (e.g., 211, 220-1) representing the product in the computer-generated reality environment (e.g., a communication session in which a representation of the salesperson is optionally presented in the computer-generated reality environment). In some embodiments, the communication session is associated with a virtual retail experience. In some embodiments, the communication session includes a two-way audio feed between the electronic device and the salesperson. In some embodiments, the communication session includes a limited two-way shared video feed in which a user of the electronic device is able to view the entire computer-generated reality environment, including visual input provided using the second electronic device associated with the salesperson, and the salesperson is able to view limited content of the computer-generated reality environment.

In some embodiments, the communication session is provided in response to receiving a request (e.g., interaction with prompt 210 to initiate the communication session) (e.g., initiated by the user; e.g., initiated by the salesperson (e.g., a representative of the retail provider)) to initiate the communication session.

In some embodiments, presenting (e.g., displaying) the virtual object (e.g., first software 211) representing the product includes superimposing the virtual object (e.g., one or more virtual representations of software applications configured for operating with a physical object) on a physical display (e.g., display 206-1) of a physical device (or representation thereof) (e.g., laptop 206) in the computer-generated reality environment. In some embodiments, the virtual object is configured to be modified in response to the information received from the communication session (e.g., the modification request initiated by the second electronic device). In some embodiments, the information from the communication session includes a modification request corresponding to a request to switch from presenting a first virtual object, to presenting a second virtual object (e.g., switching from first software 211 in FIG. 2D to second software 212 in FIG. 2E). For example, if the physical device is a laptop (e.g., 206), and one of the virtual objects is a first software application (e.g., 211) configured to operate on the laptop (e.g., the software application is rendered (e.g., superimposed) as being presented on the display screen of the laptop in the computer-generated reality environment), in response to receiving the modification request, the electronic device switches from presenting the first software application on the display screen of the laptop, to presenting a different software application (e.g., second software 212) on the display screen of the laptop.

At block 306, while providing the communication session, the device (e.g., 100a, 200) adjusts the presentation of the virtual object (e.g., 211, 220-1) representing the product in the computer-generated reality environment using information received (e.g., from a second (e.g., remote) electronic device) from the communication session. For example, in some embodiments, the information received from the communication session is a modification request initiated by a second electronic device associated with the salesperson. In some embodiments, the modification request corresponds to a request for the first electronic device (e.g., device 200) to modify at least one characteristic of the computer-generated reality environment (e.g., modifying or presenting one or more virtual objects in the computer-generated reality environment). In some embodiments, in response to receiving the modification request, the device modifies an appearance of the computer-generated reality environment based on the modification request initiated by the second electronic device. In some embodiments, modifying the appearance of the computer-generated reality environment based on the modification request includes presenting a modification of the object (e.g., a change in the orientation/pose of a virtual object, adding a virtual object to the environment, removing a virtual object from the environment)). In some embodiments, modifying the appearance of the computer-generated reality environment based on the modification request includes presenting a virtual object that is associated with the object (e.g., a physical object) in the computer-generated reality environment.

In some embodiments, adjusting the presentation of the virtual object representing the product in the computer-generated reality environment using information received from the communication session includes presenting a different virtual object (e.g., second software 212) (e.g., a virtual representation of a different product in a product gallery; e.g., a highlighting or annotation associated with the object).

In some embodiments, adjusting the presentation of the virtual object representing the product in the computer-generated reality environment using information received from the communication session includes ceasing to present a virtual object (e.g., first software 211 is no longer displayed in FIG. 2E) (e.g., ceasing to present the object (e.g., when the object is a virtual object); e.g., ceasing to present a virtual representation of a different product in a product gallery).

In some embodiments, while providing the communication session, the device detects an input (e.g., an input provided by the user), and in response to detecting the input, modifies the virtual object representing the product in the computer-generated reality environment based on the detected input (e.g., modifying an appearance of the object (e.g., virtual object) based on the detected input). In some embodiments, the input corresponds to a gesture (e.g., a hand gesture).

In some embodiments, modifying the virtual object representing the product in the computer-generated reality environment based on the detected input includes modifying an appearance of one or more virtual objects based on at least one of a magnitude and direction of the gesture (e.g., switching between single iterations of items (e.g., presented applications) when the gesture is a small magnitude, or skipping between groups of items when the gesture is large; e.g., moving forward in an order of items (e.g., applications) when the gesture is in a first direction, or moving backward in the order when the gesture is a second (opposite) direction).

In some embodiments, the computer-generated reality environment is an augmented reality environment (e.g., an environment with virtual and physical objects), and the technique further includes detecting a second input (e.g., an input from the user; e.g., an input from the salesperson), and in response to detecting the second input, transitioning the computer-generated reality environment to a virtual environment (e.g., a fully virtual environment with no physical objects) while continuing to provide the communication session (e.g., as shown in FIG. 2H).

In some embodiments, generating the computer-generated reality environment further includes generating a data stream to be received by a second electronic device associated with the salesperson (e.g., the electronic device generates a data stream that is transmitted (e.g., via a communications network) to an electronic device associated with the salesperson). In some embodiments, the data stream includes a representation of at least a portion of the computer-generated reality environment (e.g., 211, 212, 220). In some embodiments, the data stream includes the virtual object representing the product. In some embodiments, the data stream excludes representations of the computer-generated reality environment (e.g., 206, 208, 218) other than the virtual object representing the product so that the salesperson is able to view the representation of the product, but is unable to view other portions of the computer-generated reality environment.

Executable instructions for performing the features of technique 300 described above are, optionally, included in a transitory or non-transitory computer-readable storage medium (e.g., memory(ies) 106) or other computer program product configured for execution by one or more processors (e.g., processor(s) 102).

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

Aspects of the techniques described above contemplate the possibility of gathering and using personal information to enable a retail experience in a computer-generated reality environment. Such information should be collected with the user's informed consent.

Entities handling such personal information will comply with well-established privacy practices and/or privacy policies (e.g., that are certified by a third-party) that are (1) generally recognized as meeting or exceeding industry or governmental requirements, (2) user-accessible, (3) updated as needed, and (4) compliant with applicable laws. Entities handling such personal information will use the information for reasonable and legitimate uses, without sharing or selling outside of those legitimate uses.

However, users may selectively restrict access/use of personal information. For example, users can opt into or out of collection of their personal information. In addition, although aspects of the techniques described above contemplate use of personal information, aspects of the techniques can be implemented without requiring or using personal information. For example, if location information, usernames, and/or addresses are gathered, they can be generalized and/or masked so that they do not uniquely identify an individual.

What is claimed is:

1. An electronic device, the electronic device comprising:
   a display;
   one or more processors; and
   memory storing one or more programs configured to be executed by the one or more processors, the one or more programs including instructions for:
      generating a computer-generated environment, including:
         presenting, in the computer-generated environment, a view of a physical environment where the electronic device is located, wherein the physical environment includes a physical object with a physical display; and
         presenting, in the computer-generated environment, a first virtual object representing a first product, wherein the first virtual object is presented superimposed on the physical display of the physical object;
      providing a communication session with a remote user while presenting the first virtual object representing the first product and the view of the physical environment in the computer-generated environment, wherein providing the communication session with the remote user includes transmitting information corresponding to the physical object and information corresponding to the first virtual object representing the first product without transmitting the view of the physical environment, wherein the information corresponding to the physical object includes product information for the physical object; and
      while providing the communication session, replacing the presentation of the first virtual object representing the first product in the computer-generated environment with a presentation of a second virtual object representing a second product using information received from the communication session, wherein the second virtual object is presented superimposed on the physical display of the physical object.

2. The electronic device of claim 1, wherein the communication session is provided in response to receiving a request to initiate the communication session.

3. The electronic device of claim 1, the one or more programs further including instructions for:
   while providing the communication session, detecting an input; and
   in response to detecting the input, modifying the first virtual object representing the first product in the computer-generated environment based on the detected input.

4. The electronic device of claim 3, wherein:
   the input corresponds to a gesture, and
   modifying the first virtual object representing the first product in the computer-generated environment based on the detected input includes modifying an appearance of one or more additional virtual objects based on at least one of a magnitude and direction of the gesture.

5. The electronic device of claim 1, wherein:
   the first product is a physical product configured to perform a set of operations in response to detecting a first set of inputs directed to the physical product; and
   the first virtual object representing the first product is a virtual representation of the physical product configured to perform the set of operations in response to detecting the first set of inputs directed to the virtual representation of the physical product.

6. The electronic device of claim 1, wherein generating the computer-generated environment includes presenting a virtual representation of the remote user in the computer-generated environment.

7. The electronic device of claim 1, wherein the computer-generated environment is an augmented reality environment, the one or more programs further including instructions for:
   detecting a second input; and
   in response to detecting the second input, transitioning the computer-generated environment to a virtual reality environment while continuing to provide the communication session.

8. The electronic device of claim 1, wherein the computer-generated environment is generated in response to detecting an input directed to an object associated with an application presented using the electronic device.

9. A non-transitory computer-readable storage medium storing one or more programs configured to be executed by one or more processors of an electronic device with a display, the one or more programs including instructions for:
generating a computer-generated environment, including:
presenting, in the computer-generated environment, a view of a physical environment where the electronic device is located, wherein the physical environment includes a physical object with a physical display; and
presenting, in the computer-generated environment, a first virtual object representing a first product, wherein the first virtual object is presented superimposed on the physical display of the physical object;
providing a communication session with a remote user while presenting the first virtual object representing the first product and the view of the physical environment in the computer-generated environment, wherein providing the communication session with the remote user includes transmitting information corresponding to the physical object and information corresponding to the first virtual object representing the first product without transmitting the view of the physical environment, wherein the information corresponding to the physical object includes product information for the physical object; and
while providing the communication session, replacing the presentation of the first virtual object representing the first product in the computer-generated environment with a presentation of a second virtual object representing a second product using information received from the communication session, wherein the second virtual object is presented superimposed on the physical display of the physical object.

10. The non-transitory computer-readable storage medium of claim 9, the one or more programs further including instructions for:
while providing the communication session, detecting an input; and
in response to detecting the input, modifying the first virtual object representing the first product in the computer-generated environment based on the detected input.

11. The non-transitory computer-readable storage medium of claim 10, wherein:
the input corresponds to a gesture, and
modifying the first virtual object representing the first product in the computer-generated environment based on the detected input includes modifying an appearance of one or more additional virtual objects based on at least one of a magnitude and direction of the gesture.

12. The non-transitory computer-readable storage medium of claim 9, wherein:
the first product is a physical product configured to perform a set of operations in response to detecting a first set of inputs directed to the physical product; and
the first virtual object representing the first product is a virtual representation of the physical product configured to perform the set of operations in response to detecting the first set of inputs directed to the virtual representation of the physical product.

13. The non-transitory computer-readable storage medium of claim 9, wherein the computer-generated environment is an augmented reality environment, the one or more programs further including instructions for:

detecting a second input; and
in response to detecting the second input, transitioning the computer-generated environment to a virtual reality environment while continuing to provide the communication session.

14. The non-transitory computer-readable storage medium of claim 9, wherein the communication session is provided in response to receiving a request to initiate the communication session.

15. The non-transitory computer-readable storage medium of claim 9, wherein generating the computer-generated environment includes presenting a virtual representation of the remote user in the computer-generated environment.

16. The non-transitory computer-readable storage medium of claim 9, wherein the computer-generated environment is generated in response to detecting an input directed to an object associated with an application presented using the electronic device.

17. A method, the method comprising:
at an electronic device:
generating a computer-generated environment, including:
presenting, in the computer-generated environment, a view of a physical environment where the electronic device is located, wherein the physical environment includes a physical object with a physical display; and
presenting, in the computer-generated environment, a first virtual object representing a first product, wherein the first virtual object is presented superimposed on the physical display of the physical object;
providing a communication session with a remote user while presenting the first virtual object representing the first product and the view of the physical environment in the computer-generated environment, wherein providing the communication session with the remote user includes transmitting information corresponding to the physical object and information corresponding to the first virtual object representing the first product without transmitting the view of the physical environment, wherein the information corresponding to the physical object includes product information for the physical object; and
while providing the communication session, replacing the presentation of the first virtual object representing the first product in the computer-generated environment with a presentation of a second virtual object representing a second product using information received from the communication session, wherein the second virtual object is presented superimposed on the physical display of the physical object.

18. The method of claim 17, further comprising:
while providing the communication session, detecting an input; and
in response to detecting the input, modifying the first virtual object representing the first product in the computer-generated environment based on the detected input.

19. The method of claim 18, wherein:
the input corresponds to a gesture, and
modifying the first virtual object representing the first product in the computer-generated environment based on the detected input includes modifying an appearance of one or more additional virtual objects based on at least one of a magnitude and direction of the gesture.

20. The method of claim 17, wherein:
the first product is a physical product configured to perform a set of operations in response to detecting a first set of inputs directed to the physical product; and
the first virtual object representing the first product is a virtual representation of the physical product configured to perform the set of operations in response to detecting the first set of inputs directed to the virtual representation of the physical product.

21. The method of claim 17, wherein the computer-generated environment is an augmented reality environment, the method further comprising
detecting a second input; and
in response to detecting the second input, transitioning the computer-generated environment to a virtual reality environment while continuing to provide the communication session.

22. The method of claim 17, wherein the communication session is provided in response to receiving a request to initiate the communication session.

23. The method of claim 17, wherein generating the computer-generated environment includes presenting a virtual representation of the remote user in the computer-generated environment.

24. The method of claim 17, wherein the computer-generated environment is generated in response to detecting an input directed to an object associated with an application presented using the electronic device.

* * * * *

UNITED STATES PATENT AND TRADEMARK OFFICE
CERTIFICATE OF CORRECTION

| | | |
|---|---|---|
| PATENT NO. | : 11,775,130 B2 | Page 1 of 1 |
| APPLICATION NO. | : 16/905032 | |
| DATED | : October 3, 2023 | |
| INVENTOR(S) | : Alexander B. Oser et al. | |

It is certified that error appears in the above-identified patent and that said Letters Patent is hereby corrected as shown below:

On the Title Page

Item (12), delete "Oser" and insert -- Oser et al. --.

Item (72), Inventor, after "Alexander B. OSER, Los Altos, CA (US)" insert -- Thomas ALT, Pullach (DE); Daniel GELDER, Breitbrunn (DE); Jeffrey S. NORRIS, Saratoga, CA (US); Michael J. ROCKWELL, Palo Alto, CA (US); and Geoffrey STAHL, San Jose, CA (US) --.

Signed and Sealed this
Eighteenth Day of March, 2025

Coke Morgan Stewart
*Acting Director of the United States Patent and Trademark Office*